United States Patent [19]

Chisum

[11] 4,256,161
[45] Mar. 17, 1981

[54] TIRE BEAD DEMOUNTING APPARATUS

[76] Inventor: Finis L. Chisum, Box 1145, Claremore, Okla. 74017

[21] Appl. No.: 958,106

[22] Filed: Nov. 6, 1978

[51] Int. Cl.³ .............................................. B60C 25/06
[52] U.S. Cl. .................................................... 157/1.17
[58] Field of Search ................................ 157/1.1, 1.17

[56] References Cited

U.S. PATENT DOCUMENTS

| 2,901,029 | 8/1959 | Mraz | 157/1.17 |
| 3,771,580 | 11/1973 | Branick | 157/1.17 |
| 3,847,197 | 11/1974 | Konen | 157/1.17 |

FOREIGN PATENT DOCUMENTS 1058360  3/1954  France .................... 157/1.17

Primary Examiner—James G. Smith
Attorney, Agent, or Firm—Head & Johnson

[57] ABSTRACT

A tool for breaking the circumferential bead of a pneumatic tire from the inward surface of the lip of a wheel rim, the tool having a body with a forward downwardly extending rim engaging tooth, a bead head slidably supported by the body, an arm pivotally supported to the body having an outer end configured to gauge the exterior surface of the lip of the wheel rim, an arm actuator slidably supported by the body, and means for longitudinally sliding the arm actuator to first pivot the arm to clamp the wheel rim lip and subsequently slidably advancing the bead head to engage the tire and force the bead away from the wheel rim lip.

14 Claims, 7 Drawing Figures

TIRE BEAD DEMOUNTING APPARATUS

BACKGROUND AND OBJECTS OF THE INVENTION

When it is necessary to remove a pneumatic tire from a wheel a difficult problem is breaking the tire bead away from the circumferential wheel rim lip. This problem is especially difficult with tubeless tires since an air-tight seal must be provided between the circumferential bead and the rim. Others have provided apparatus for accomplishing this objective, but most of the devices available on the market today are relatively expensive, are difficult to handle, and require a large number of working parts. The present invention is directed towards a simplified device for breaking the bead of a tire from the lip of a wheel rim which employs a minimum number of working parts and which utilizes a single actuating cylinder to provide the motive force for both the clamping of the device to the wheel rim and for breaking the tire bead from the rim.

It is therefore an object of this invention to provide an improved tire bead demounting tool.

A more particular object of the invention is to provide a tool for breaking the bead of a pneumatic tire from the lip of a rim in which the tool is actuated to both grasp the rim and subsequently move the tire bead and sidewall away from the rim utilizing a single actuating mechanism and a single control.

These general objects as well as other and more specific objects of the invention will be fulfilled in the following description and claims, taken in conjunction with the attached drawings.

DESCRIPTION OF THE VIEWS

FIG. 3 also discloses a step in utilizing the device wherein the arm has been moved to grasp the lip of a wheel rim to firmly attach the device to the wheel rim preparatory to breaking the bead of the tire away from the wheel rim lip.

SUMMARY OF THE INVENTION

A tool for breaking the circumferential bead of a pneumatic tire from the lip of a wheel rim. The tool includes a body having a forward end defining an integral downwardly extending rim engaging tooth. A cylinder is supported to the body or is formed as a part of the body, the cylinder having a piston rod reciprocally extending therefrom in a direction towards the forward end of the body. The bead head is reciprocally supported on the body and is co-axially displaced by the piston rod extending from the cylinder. The bead head has a forward end configured to engage the bead and sidewall of a tire. An arm is pivotally affixed to one end to the body and the other end of the arm extends to engage the outer surface of the wheel rim lip at a point opposite the body tooth. An arm actuator is slidably supported by the body and positioned by the piston rod and has an inclined upper surface which is sloped upwardly and rearwardly. A yoke is received by the body, the upper end of which engages the inclined surface of the arm actuator. The lower end of the yoke is attached to the arm. As the piston rod advances, it first moves the arm actuator to raise the yoke and thereby the arm affixed to it to engage the lower surface of the rim and clamp the rim lip between the arm and the body downwardly extending tooth. Subsequent to this clamping action, further advancement of the piston rod moves the bead head forwardly to engage the tire bead and sidewall and push it inwardly away from the rim lip. Thus, the invention provides an apparatus wherein a single actuating device serves to sequentially grasp the rim lip of the wheel and subsequently pushes the tire bead and sidewall away from the rim lip.

DETAILED DESCRIPTION

Figure 1:
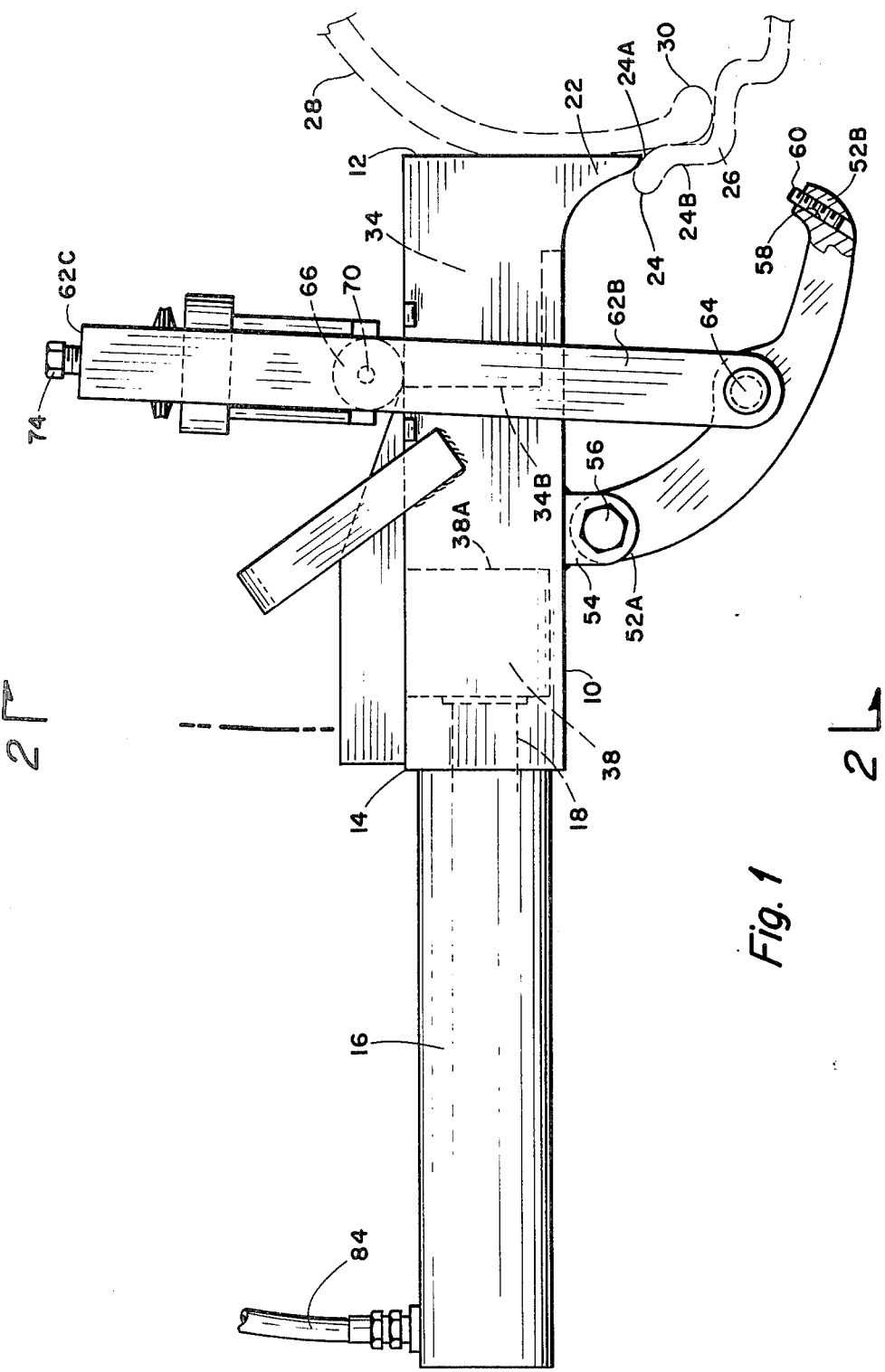
FIG. 1 is an elevational side view of the tool of this invention supported adjacent to a pneumatic tire mounted on a rim preparatory for utilization of the tool to break the tire bead away from the rim lip.
Figure 2:
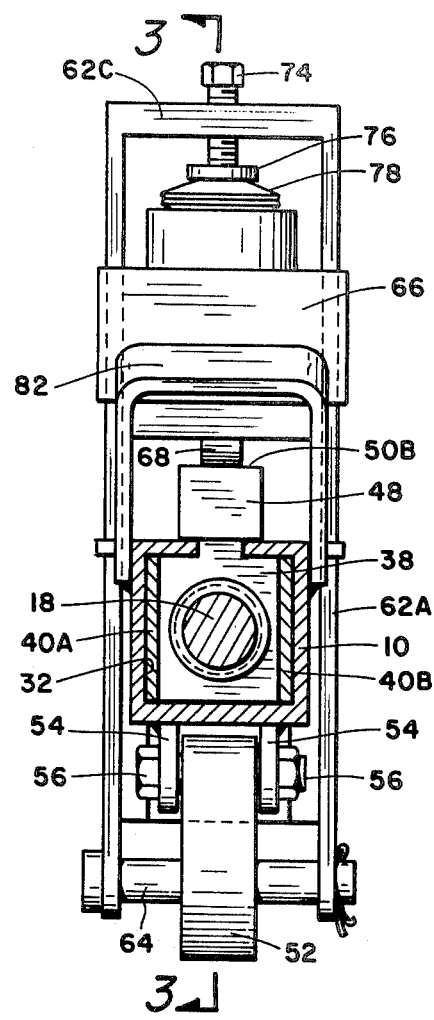
FIG. 2 is a cross-sectional end view taken along the line 2—2 of FIG. 1.
Figure 7:
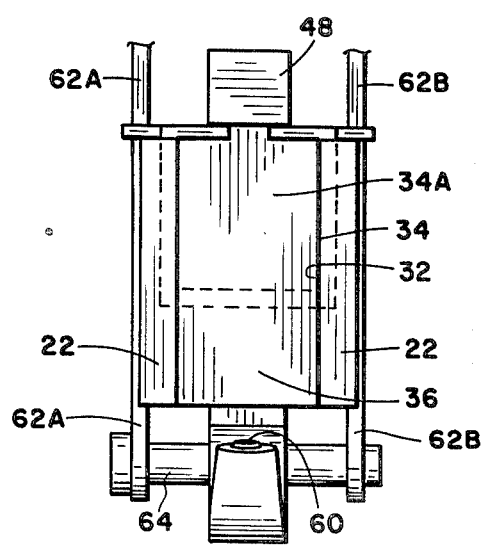
FIG. 7 is an end view taken along the line 7—7 of FIG. 3. The rim and tire are not included in FIG. 7.
Figure 3:
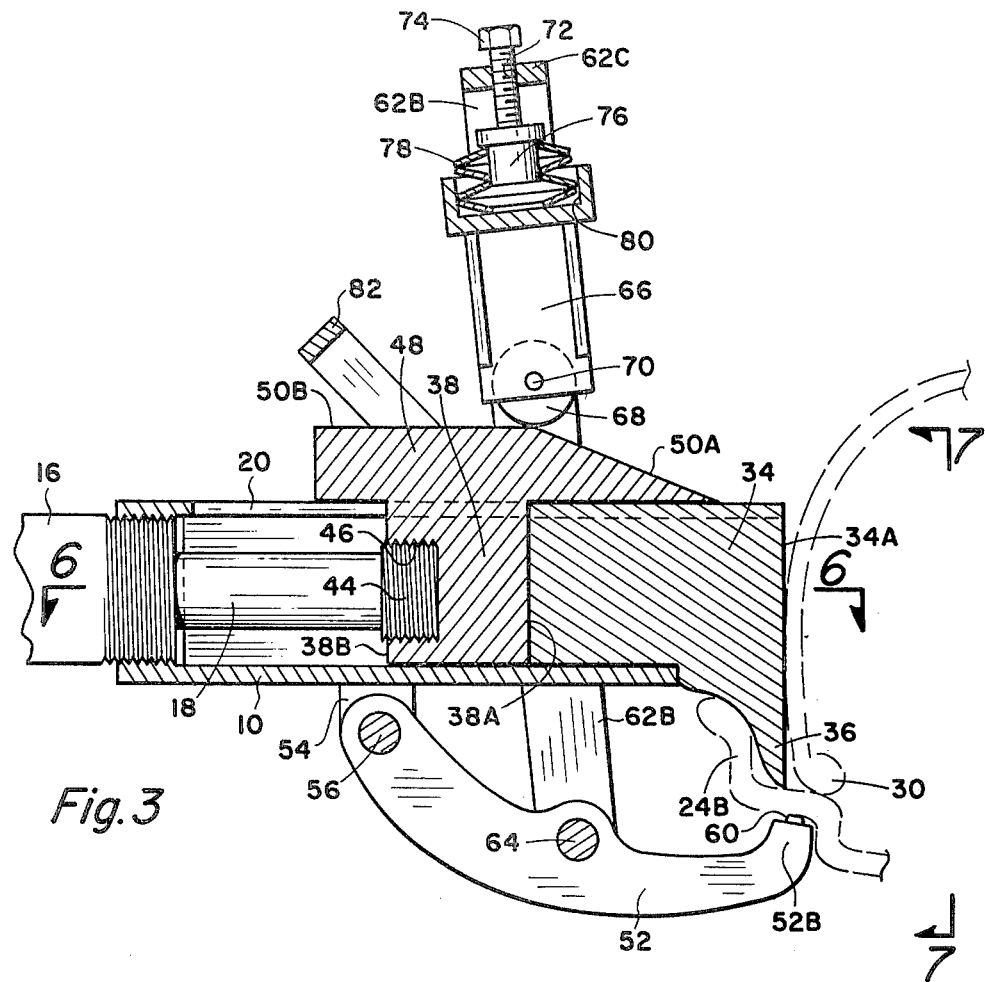
FIG. 3 is a cross-sectional view taken along the line 3—3 of FIG. 2, showing more details of the internal arrangement of the tire demounting tool.

Referring to the drawings and first to FIGS. 1, 2, and 3, an apparatus which embodies the invention is illustrated. The apparatus includes a body 10 which has a forward end 12 and a rearward end 14. Attached to the body rearward end 14 is a hydraulic or pneumatic cylinder 16 which has a piston rod 18. Cylinder 16 may be integrally formed as a part of body 10. Body 10 is hollow in part and includes a slot 20 in the upper surface.

The front surface 12 of body 10 includes an integral downwardly extending tooth projection 22 which is designed to extend down over the top edge of the lip 24 of a wheel rim 26. The rim lip 26 has an inner surface 24A and an outer surface 24B. A tire 28 is mounted on rim 26 having a bead 30 which engages the wheel lip inner surface 24A. The function of the tool of this invention is to move the bead 30 away from engagement with the wheel rim lip 24.

Figure 6:
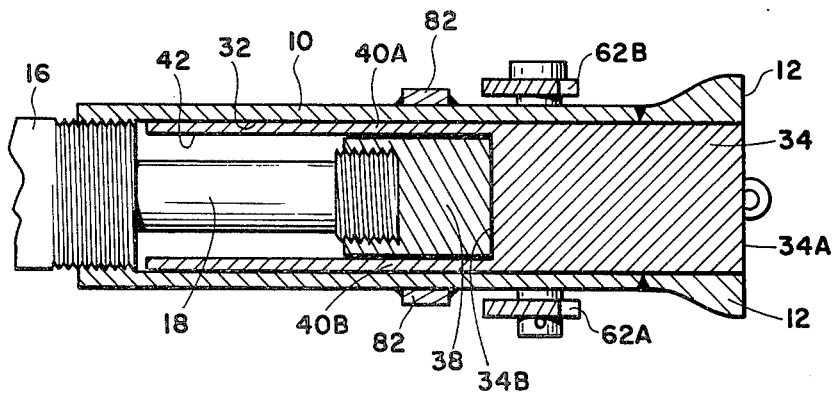
FIG. 6 is a cross-sectional view taken along the line 6—6 of FIG. 3.

As previously indicated, the body 10 is hollow or, in other words, has a longitudinal recess 32 therein which extends through to the front forward end 12. Slidably positioned within the recess 32 is a bead head 34 having a forward face 34A. In the retracted position of bead head 34, the face 34A is planar with the body forward end 12. The bead head forward end includes an integral downwardly extending tooth 36 which matches the tooth body 2 of body 10, which, in the construction illustrated, is in the form of two spaced apart portions separated by the recess 32. FIGS. 1, 3, and 6 show the bead head 34 in the fully withdrawn position within body 10.

An arm actuator 38 is also slidably positioned within recess 32 and body 10 rearwardly of bead head 34. In the illustrated arrangement, the bead head 34 includes opposed wing portions 40A and 40B which extend rearwardly from the rearward surface 34B of the bead head. The wing portions 40A and 40B are spaced apart providing a recess 42 therebetween which slidably receives the arm actuator 38. Piston rod 18 has a threaded outer end 44 which is threadably received in a threaded recess 46 in the arm actuator surface 38B. Thus the position of arm actuator 38 is controlled by cylinder 16.

Arm actuator 38 has an upwardly extending integral portion 48 which extends above body 10 through slot 20. The upper portion 48 defines an upper surface having a forward inclined portion 50A and a rearward straight surface 50B which is in a plane parallel the axis of the piston rod 18.

Pivoted to body 10 is an arm 52. The inner end 52A is pivotally attached to a bracket 54 extending from body 10, the arm pivoting about pin 56. The arm outer end 52B is configured to engage the outer surface 24B of the wheel rim lip. To enhance the gripping action of the arm outer end 52B, a threaded recess 50A is provided in the arm which receives an allen screw 60.

Arm 52 is controlled by a yoke which consists of opposed yoke portions 62A and 62B connected at the top with top portion 62C. The lower ends of the yoke portions 62A and 62B receive a pin 64 which extends through the middle portion of arm 52.

Slidably received between the yoke portions 62A and 62B above body 10 is a carriage 66 which supports, at the lower end thereof, a roller 68, the roller being rotatable about pin 70. The roller 68 engages the arm actuator upper surface 50A and 50B. The yoke top portion 62C has a threaded opening 72 receiving bolt 74. The lower end of bolt 74 receives a cylindrical collar 76 which engages a stack of cup-shaped compression washers 78. The upper end of carriage 68 has a cylindrical recess 80 which also receives compression washers 78. By threaded adjustment of bolt 74, the angle of pivotation of arm 52 is controlled and the compression washers 78 function like a compression spring.

To aid in the handling of the tool, a handle 82 in the form of a U-shaped member has the lower ends affixed to body 10. Obviously the handle as well as other features of the invention may be arranged in a variety of different ways.

Cylinder 16 is supplied by hydraulic or pneumatic pressure through a hose 84 which leads to a source of hydraulic or pneumatic pressure controlled by a valve (not shown), which may be in the form of a foot-operated valve so that the operator may have both hands free when utilizing the device.

OPERATION

To break the bead 30 of a tire from the wheel rim lip 24, the tool is first positioned adjacent the sidewall of tire 28 with the tooth 20 resting upon the rim lip 24. Piston rod 18 is fully withdrawn, all as shown in FIG. 1. The operator then actuates a control valve, which may be, as previously indicated, a foot-operated valve (not shown) to apply hydraulic fluid pressure to cylinder 66 to advance piston rod 18. As the rod moves forward, arm actuator 38 is axially forwardly advanced. The inclined surface 50A of the arm actuator moves against the roller 68, moving the yoke upwardly and thereby pivoting arm 52 upwardly towards the position as shown in FIG. 3. This moves the arm outer end 52B into contact with the rim lip outer surface 24B and pulls the forward end 12 of body 10 and the forward end of the bead head downwardly between the outer surface of the tire bead 30 and the interior surface 24A of the rim lip, and by this action, the tool is securely fastened to the rim lip.

Figure 4:
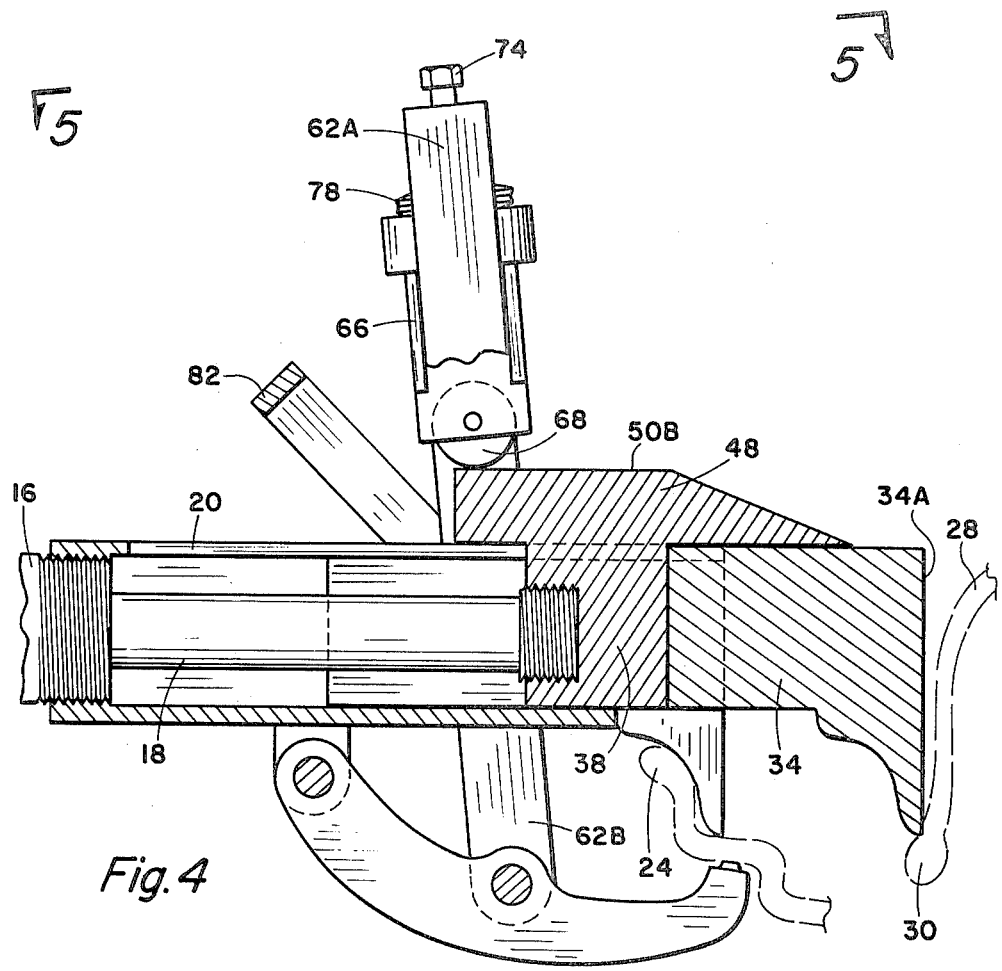
FIG. 4 is a cross-sectional view as shown in FIG. 3 and showing the tool in the position wherein the bead and sidewall of a tire have been moved away from the lip of a wheel rim.
Figure 5:
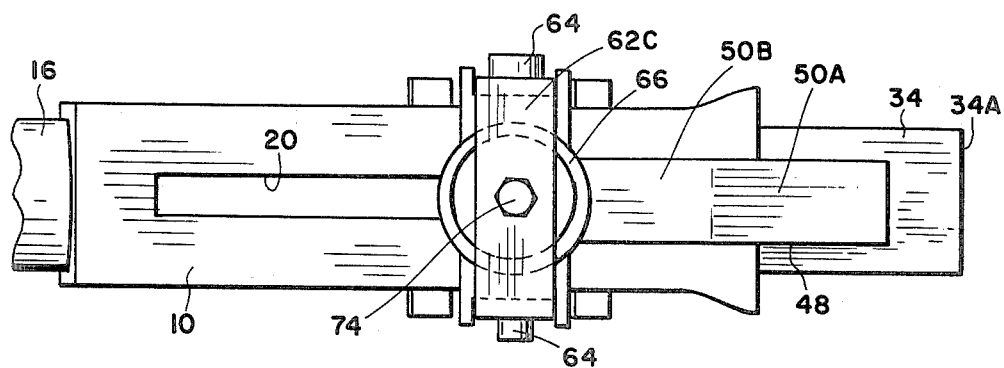
FIG. 5 is an external top view of the tool taken along the line 5—5 of FIG. 4.

Further axial advance of piston rod 18A causes the arm actuator forward surface 38B to engage the rearward surface 34B of bead head 34. Subsequent forward advancement of the rod moves the bead head 34 forwardly towards the position as shown in FIG. 4. This forward movement causes the bead head forward surface 34A to push the sidewall and bead 30 of tire 28 away from engagement with wheel rim lip 24. It can be seen that as the bead head 34 is moved axially forward, the planar surface 50B on the top of the arm actuator upper portion 48 maintains tension on the yoke and arm 52. The amount of tension applied by arm 52 is regulated by bolt 74 and the compression washers 78.

As the piston rod 18 is withdrawn, which may be accomplished either by a spring internally of the cylinder 16 (not shown) or by the use of a double acting cylinder (not shown), the bead head 34 is withdrawn and tension applied by arm 52 is released so that the device is disengageable from the rim. An important feature of the device of this invention is the arrangement wherein a single force applied by a hydraulic cylinder advancing a piston rod serves not only to clamp the tool to the lip of a wheel rim but to simultaneously, with the subsequent forward motion of the piston rod, break the bead of a tire from the wheel rim lip. Thus, the operator needs only one control actuation to expeditiously cause the tool to attach to the rim followed by breaking the bead from the wheel rim lip.

The function of the apparatus is simple and straightforward, utilizing a minimum number of components. It can be seen that the actual configuration of the tool which employs the principle of this invention may change in many respects. The arrangement of the yoke arms 62A and 62B, the arrangement of carriage 66 with its roller 68, the means of utilizing spring action such as exemplified by compression washer 68 all may vary considerably in actual design. In addition, the shape of the arm actuator and the bead head may vary considerably as well as the configuration of body 10, all while nevertheless maintaining the same principle of operation of the invention.

While the invention has been described with a certain degree of particularity, it is manifest that many changes may be made in the details of construction and the arrangment of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A tool for breaking the circumferential bead of a pneumatic tire from the lip of a wheel rim comprising:
   a body having a forward end defining an integral downwardly extending rim engaging tooth;
   a cylinder having a piston rod reciprocally extending therefrom, the cylinder being attached to the body at the end opposite the tooth;
   a bead head having forward and rearward ends, the forward end configured to engage the bead and sidewall of a tire, the bead head being reciprocally supported by said body;
   an arm having an inner end and an outer end, the outer end of the arm adaptable to engage the outer surface of the lip of a wheel rim, the inner end being pivotally attached to said body;
   an arm actuator supported by said body and positionable by said piston rod, and having an inclined upper surface sloped upwardly and rearwardly; and
   a yoke having an upper and lower end, the lower end being pivotally secured to said arm intermediate its ends, the upper end having engagement with said arm actuator inclined surface, whereby when said piston rod is forwardly advanced said inclined surface displaces said yoke and thereby said arm in an upwardly direction to clamp a wheel rim lip between the arm outer end and said body rim engaging tooth, and further movement of said piston rod moves said bead head forward to move the tire bead and sidewall away from the wheel rim lip.

2. A tool according to claim 1 including:
a roller rotatably affixed to said yoke upper end, said roller engaging said arm actuator inclined surface.

3. A tool according to claim 1 wherein said arm actuator upper surface is defined by a forward inclined surface sloped upwardly and rearwardly and a rearward planar surface parallel the axis of said piston rod, the height of the planar surface being dimensioned to retain the outer end of said arm upwardly to firmly engage a wheel rim lip between said arm forward end and said body tooth.

4. A tool according to claim 1 including:
means of adjusting the length of said yoke between said arm and said upper end having engagement with said arm actuator upper surface whereby the force of contact of the arm outer end with a wheel rim lip may be varied.

5. A tool according to claim 1 wherein said body has a longitudinal recess therein communicating with said forward end, said bead head being slidably received in the body recess, said body forward end and the bead head forward end being in a common plane when said bead head is fully rearwardly withdrawn, the cross-sectional configuration of the bead head front end conforming with the cross-sectional configuration of the body front end said bead head thereby having an integral downwardly extending tooth configured to match said body downwardly extending rim engaging tooth.

6. A tool according to claim 1 wherein said arm actuator is affixed to the outer end of said piston rod.

7. A tool according to claim 2 wherein said yoke is in the form of paralleled vertical bars extending to opposite sides of said body and a horizontal connecting portion across the top having a threaded opening therein;
a carriage slidably supported between said yoke parallel bars, said roller being rotatably affixed to the carriage lower end;
a bolt received in said threaded opening; and
compression spring means between the lower end of said bolt and said carriage.

8. A tool for breaking the circumferential bead of a tire from the inward surface of the lip of a wheel rim, comprising:
a body having a forward downwardly extending rim engaging tooth;
a bead head slidably supported by said body;
an arm pivotally supported to said body having an outer end configured to engage the exterior surface of the lip of a wheel rim;
an arm actuator slidably supported by said body; and
means for longitudinally sliding said arm actuator to first pivot said arm to engage a wheel rim lip between said arm outer end and said body tooth and subsequently slidably advancing said bead head to engage the bead of a tire to force the bead away from the wheel rim lip.

9. A tool according to claim 8 wherein said arm actuator is defined by an upper surface having a forward slope portion inclined upwardly and rearwardly and a connecting rearward planar portion; and including
a yoke having said arm attached to its lower end; and
means at the upper end of said yoke for engaging said arm actuator whereby forward movement of said arm actuator first pivots said arm upwardly by said upper surface sloped portion to engage a wheel rim lip and said upper surface planar portion retains said arm in engagement with the wheel rim lip as said arm actuator is further forwardly advanced to engage and move said bead head forward.

10. A tool according to claim 8 wherein said body has a longitudinal recess therein communicating with said forward end, said bead head being slidably received in the body recess, said body having a forward end and said bead head having a forward end in a common plane when said bead head is fully rearwardly withdrawn, the cross-sectional configuration of the bead head forward end conforming with the cross-sectional configuration of the body forward end, said bead head thereby having an integral downwardly extending tooth configured to match said body downwardly extending rim engaging tooth.

11. A tool according to claim 8 wherein said means for longitudinally sliding said arm actuator is a cylinder having a piston rod reciprocally extending therefrom, the cylinder being attached to said body and the piston rod having engagement with said arm actuator.

12. A tool according to claim 9 including:
means of adjusting the length of said yoke between said arm and said upper end having engagement with said arm actuator upper surface whereby the force of contact of the arm outer end with a wheel rim lip may be varied.

13. A tool according to claim 9 wherein said yoke is in the form of paralleled vertical bars extending to opposite sides of said body and a horizontal connecting portion across the top having a threaded opening therein;
a carriage slidably supported between said yoke parallel bars;
a roller being rotatably affixed to the carriage, the roller engaging said arm actuator upper surface;
a bolt received in said threaded opening; and
compression spring means between the lower end of said bolt and said carriage.

14. A tool according to claim 11 wherein said arm actuator is affixed to the outer end of said piston rod.

* * * * *